(12) United States Patent
Luo et al.

(10) Patent No.: US 8,730,933 B2
(45) Date of Patent: May 20, 2014

(54) METHOD AND APPARATUS FOR MULTIPLEXING DATA AND REFERENCE SIGNAL IN A WIRELESS COMMUNICATION SYSTEM

(75) Inventors: Xiliang Luo, San Diego, CA (US); Juan Montojo, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 302 days.

(21) Appl. No.: 12/561,212

(22) Filed: Sep. 16, 2009

(65) Prior Publication Data

US 2010/0074244 A1    Mar. 25, 2010

Related U.S. Application Data

(60) Provisional application No. 61/098,002, filed on Sep. 18, 2008.

(51) Int. Cl.
*H04J 1/00* (2006.01)
*H04W 4/00* (2009.01)

(52) U.S. Cl.
USPC .......................................... 370/343; 370/330

(58) Field of Classification Search
USPC .................................. 370/343, 330
See application file for complete search history.

(56) References Cited

U.S. PATENT DOCUMENTS

| | | | |
|---|---|---|---|
| 5,682,376 A | 10/1997 | Hayashino et al. | |
| 6,754,475 B1 | 6/2004 | Harrison et al. | |
| 7,583,939 B2 | 9/2009 | Mehta et al. | |
| 7,701,919 B2 | 4/2010 | Ah Lee | |
| 7,912,115 B2 | 3/2011 | Zhao et al. | |
| 7,969,943 B2 | 6/2011 | Miki et al. | |
| 7,974,177 B2 | 7/2011 | Ofuji et al. | |
| 8,036,197 B2 | 10/2011 | Pajukoski et al. | |
| 8,102,896 B2 | 1/2012 | Pajukoski et al. | |
| 8,130,711 B2 | 3/2012 | Noh et al. | |
| 8,160,016 B2 | 4/2012 | Papasakellariou et al. | |
| 8,165,228 B2 | 4/2012 | Lee et al. | |
| 2006/0172704 A1 | 8/2006 | Nishio et al. | |
| 2007/0183386 A1* | 8/2007 | Muharemovic et al. | 370/344 |
| 2008/0232449 A1* | 9/2008 | Khan et al. | 375/220 |
| 2009/0046674 A1 | 2/2009 | Gao et al. | |
| 2009/0060004 A1* | 3/2009 | Papasakellariou et al. | 375/140 |
| 2009/0185638 A1* | 7/2009 | Imamura et al. | 375/298 |
| 2009/0190685 A1* | 7/2009 | Kimura | 375/267 |

(Continued)

FOREIGN PATENT DOCUMENTS

| | | |
|---|---|---|
| CN | 101208874 A | 6/2008 |
| EP | 1942596 | 7/2008 |

(Continued)

OTHER PUBLICATIONS

International Search Report—PCT/US2009/057576, International Search Authority—European Patent Office—Feb. 3, 2010.

(Continued)

*Primary Examiner* — Mark Rinehart
*Assistant Examiner* — Angel Brockman
(74) *Attorney, Agent, or Firm* — Liem T. Do (57) ABSTRACT

Certain aspects of the present disclosure allow reference and data-conveying modulations symbols to be multiplexed in the time domain to form an SC-FDM waveform.

29 Claims, 8 Drawing Sheets

(56) References Cited

U.S. PATENT DOCUMENTS

| | | | |
|---|---|---|---|
| 2009/0245399 A1* | 10/2009 | Lee et al. | 375/260 |
| 2010/0002800 A1 | 1/2010 | Kim et al. | |
| 2010/0034165 A1* | 2/2010 | Han et al. | 370/330 |
| 2010/0080154 A1 | 4/2010 | Noh et al. | |
| 2011/0141982 A1 | 6/2011 | Zhang et al. | |

FOREIGN PATENT DOCUMENTS

| | | |
|---|---|---|
| JP | 8321820 A | 12/1996 |
| JP | 2008028977 A | 2/2008 |
| JP | 2008053866 A | 3/2008 |
| JP | 2012506226 A | 3/2012 |
| WO | 2005015797 | 2/2005 |
| WO | WO2006096784 | 9/2006 |
| WO | WO-2009019878 A1 | 2/2009 |

OTHER PUBLICATIONS

Niels Hadaschik et al., "Achievable Data Rate of Wideband OFDM With Data-Aided Channel Estimation" Personal indoor and mobile radio communication, 2006 IEEE 7th international symposium on, IEEE, PI, Sep. 1, 2006, pp. 1-5, XP031023756.

Nortel: "Further discussion on UL reference signals" 3GPP Draft; R1-063105, 3rd Generation Partnership Project (3GPP), Mobile Competence Centre ; 650, Route Des Lucioles ; F-06921 Sophia-Antipolis Cedex ; France, vol. RAN WG1, No. Riga, Latvia; Nov. 1, 2006, XP050103564 [retrieved on Nov. 1, 2006] the whole document.

NTT DoCoMo et al: "Multiplexing Method for Orthogonal Reference Signals for E-UTRA Uplink" 3GPP Draft; R1-062726 UL Orthogonal Reference Signal, 3rd Generation Partnership Project (3GPP), Mobile Competence Centre ; 650, Route Des Lucioles ; F-06921 Sophia-Antipolis Cedex ; France, vol. RAN WG1, No. Seoul, Korea; Oct. 4, 2006, XP050103214 [retrieved on Oct. 4, 2006] the whole document.

Panasonic et al: "Uplink reference signal structure and allocation for E-UTRA" 3GPP Draft; R1-070190, 3rd Generation Partnership Project (3GPP), Mobile Competence Centre ; 650, Route Des Lucioles ; F-06921 Sophia-Antipolis Cedex ; France, vol. RAN WG1, No. Sorrento, Italy; Jan. 10, 2007, XP050104232 [retrieved on Jan. 10, 2007] the whole document.

Texas Instruments: "Uplink Reference Signal Design in EUTRA" 3GPP Draft; R1-063228_ULRS, 3rd Generation Partnership Project (3GPP), Mobile Competence Centre ; 650, Route Des Lucioles ; F-06921 Sophia-Antipolis Cedex ; France, vol. RAN WG1, No. Riga, Latvia; Nov. 2, 2006, XP050103681 [retrieved on Nov. 2, 2006] the whole document.

Noh et al, "U.S. Appl. No. 61/100,271, filed Sep. 26, 2008, DMRS Transmission for Uplink MIMO", p. 1-1 6.

Written Opinion—PCT/US2009/057576—ISA/EPO—Mar. 2, 2010.

Lee D.H., et al., "A novel pilot mapping method for channel-quality estimation in SC-FDMA system", Communications, 2007. APCC 2007. Asia-Pacific Conference on, Oct. 20, 2007, pp. 307-310.

Luo X., et al., "Transmit Diversity Scheme over Single SC-FDM Symbol for LTE-Advanced", Global Telecommunications Conference, 2009. GLOBECOM 2009. IEEE, Dec. 4, 2009.

Mamoru Sawahashi et al., "Layer 1/Layer 2 Control Channel Structure in Single-Carrier FDMA Based Evolved UTRA Uplink," Technical Report of the Institute of Electronics, Information and Communication Engineers, Japan, Oct. 12, 2006, vol. 106, No. 305, pp. 137-142, RCS2006-156.

CMCC, "Discussions on DM-RS Design for LTE-A", 3GPP TSG-RAN WG1 Meeting #57, May 4, 2009, R1-092189.

NTT DoCoMo, Mitsubishi Electric, NEC, Panasonic, Sharp, Toshiba Corporation, "Orthogonal Reference Signal Structure for Uplink MIMO in E-UTRA", 3GPP TSG-RAN WG1 Meeting #47, Nov. 6, 2006, R1-063308.

Taiwan Search Report—TW098131634—TIPO—Jun. 24, 2013.

Texas Instruments, "Overview of Distributed ("Sounding") Reference Signal Multiplexing Methods in EUTRA Ulink", 3GPP TSG-RAN WG1 Meeting #46b, Oct. 4, 2006, R1-062643.

Texas Instruments, "Uplink Reference Signal Sequence Assignments in E-UTRA", 3GPP TSG-RAN WG1 Meeting #50, Oct. 20, 2007, R1-073419.

* cited by examiner

METHOD AND APPARATUS FOR MULTIPLEXING DATA AND REFERENCE SIGNAL IN A WIRELESS COMMUNICATION SYSTEM

CLAIM OF PRIORITY UNDER 35 U.S.C. §119

The present application for patent claims benefit of U.S. Provisional Patent Application Ser. No. 61/098,002 filed Sep. 18, 2008, and assigned to the assignee hereof and hereby expressly incorporated by reference herein.

TECHNICAL FIELD

The present disclosure relates generally to communication, and more specifically to wireless communication.

BACKGROUND

Wireless communication systems are widely deployed to provide various communication content such as voice, video, packet data, messaging, or broadcast content. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless communication system may include a number of Node Bs that can support communication for a number of user equipments (UEs). A UE may communicate with a Node B via the downlink and uplink. The downlink (or forward link) refers to the communication link from the Node B to the UE, and the uplink (or reverse link) refers to the communication link from the UE to the Node B.

SUMMARY

Certain aspects of the present disclosure provide a method for wireless communications via single carrier frequency division multiplexing (SC-FDM) waveform. The method generally includes multiplexing one or more reference symbols and one or more data-conveying modulation symbols in the time domain to obtain an SC-FDM symbol, and transmitting the SC-FDM waveform within an SC-FDM symbol period in an uplink transmission slot.

Certain aspects of the present disclosure provide a method for wireless communications via single carrier frequency division multiplexing (SC-FDM) waveform. The method generally includes receiving an SC-FDM symbol in an uplink transmission slot, de-multiplexing the SC-FDM symbol in the time domain to obtain one or more reference symbols and one or more data-conveying modulation symbols; and processing the reference symbols and one or more data-conveying modulation symbols.

Certain aspects of the present disclosure provide an apparatus for wireless communications via single carrier frequency division multiplexing (SC-FDM) waveform. The apparatus generally includes logic for multiplexing one or more reference symbols and one or more data-conveying modulation symbols in the time domain to obtain an SC-FDM symbol, and logic for transmitting the SC-FDM waveform within an SC-FDM symbol period in an uplink transmission slot.

Certain aspects of the present disclosure provide an apparatus for wireless communications via single carrier frequency division multiplexing (SC-FDM) waveform. The apparatus generally includes logic for receiving an SC-FDM symbol in an uplink transmission slot, logic for de-multiplexing the SC-FDM symbol in the time domain to obtain one or more reference symbols and one or more data-conveying modulation symbols, and logic for processing the reference symbols and one or more data-conveying modulation symbols.

Certain aspects of the present disclosure provide an apparatus for wireless communications via single carrier frequency division multiplexing (SC-FDM) waveform. The apparatus generally includes means for multiplexing one or more reference symbols and one or more data-conveying modulation symbols in the time domain to obtain an SC-FDM symbol, and means for transmitting the SC-FDM waveform within an SC-FDM symbol period in an uplink transmission slot.

Certain aspects of the present disclosure provide an apparatus for wireless communications via single carrier frequency division multiplexing (SC-FDM) waveform. The apparatus generally includes means for receiving an SC-FDM symbol in an uplink transmission slot, means for de-multiplexing the SC-FDM symbol in the time domain to obtain one or more reference symbols and one or more data-conveying modulation symbols, and means for processing the reference symbols and one or more data-conveying modulation symbols.

Certain aspects provide a computer-program product for wireless communications via single carrier frequency division multiplexing (SC-FDM) waveform, comprising a computer-readable medium having instructions stored thereon, the instructions being executable by one or more processors. The instructions generally include instructions for multiplexing one or more reference symbols and one or more data-conveying modulation symbols in the time domain to obtain an SC-FDM symbol; and instructions for transmitting the SC-FDM waveform within an SC-FDM symbol period in an uplink transmission slot.

Certain aspects provide a computer-program product for wireless communications via single carrier frequency division multiplexing (SC-FDM) waveform, comprising a computer-readable medium having instructions stored thereon, the instructions being executable by one or more processors. The instructions generally include instructions for receiving an SC-FDM symbol in an uplink transmission slot, instructions for de-multiplexing the SC-FDM symbol in the time domain to obtain one or more reference symbols and one or more data-conveying modulation symbols, and instructions for processing the reference symbols and one or more data-conveying modulation symbols.

Certain aspects of the present disclosure provide an apparatus for wireless communications via single carrier frequency division multiplexing (SC-FDM) waveform. The apparatus generally includes at least one processor configured to multiplex one or more reference symbols and one or more data-conveying modulation symbols in the time domain to obtain an SC-FDM symbol, and transmit the SC-FDM waveform within an SC-FDM symbol period in an uplink transmission slot.

Certain aspects of the present disclosure provide an apparatus for wireless communications via single carrier frequency division multiplexing (SC-FDM) waveform. The apparatus generally includes at least one processor configured to receive an SC-FDM symbol in an uplink transmission slot, de-multiplex the SC-FDM symbol in the time domain to obtain one or more reference symbols and one or more data-conveying modulation symbols, and process the reference symbols and one or more data-conveying modulation symbols.

BRIEF DESCRIPTION OF THE DRAWINGS

So that the manner in which the above recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

The techniques described herein may be used for various wireless communication systems such as CDMA, TDMA, FDMA, OFDMA, SC-FDMA and other systems. The terms "system" and "network" are often used interchangeably. A CDMA system may implement a radio technology, such as Universal Terrestrial Radio Access (UTRA) or cdma2000. UTRA includes Wideband CDMA (WCDMA) and other variants of CDMA. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, or Flash-OFDM®. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). cdma2000 and UMB are described in documents from an organization named "3rd Generation Partnership Project 2" (3GPP2). For clarity, certain aspects of the techniques are described below for LTE, and LTE terminology is used in much of the description below.

Figure 1:
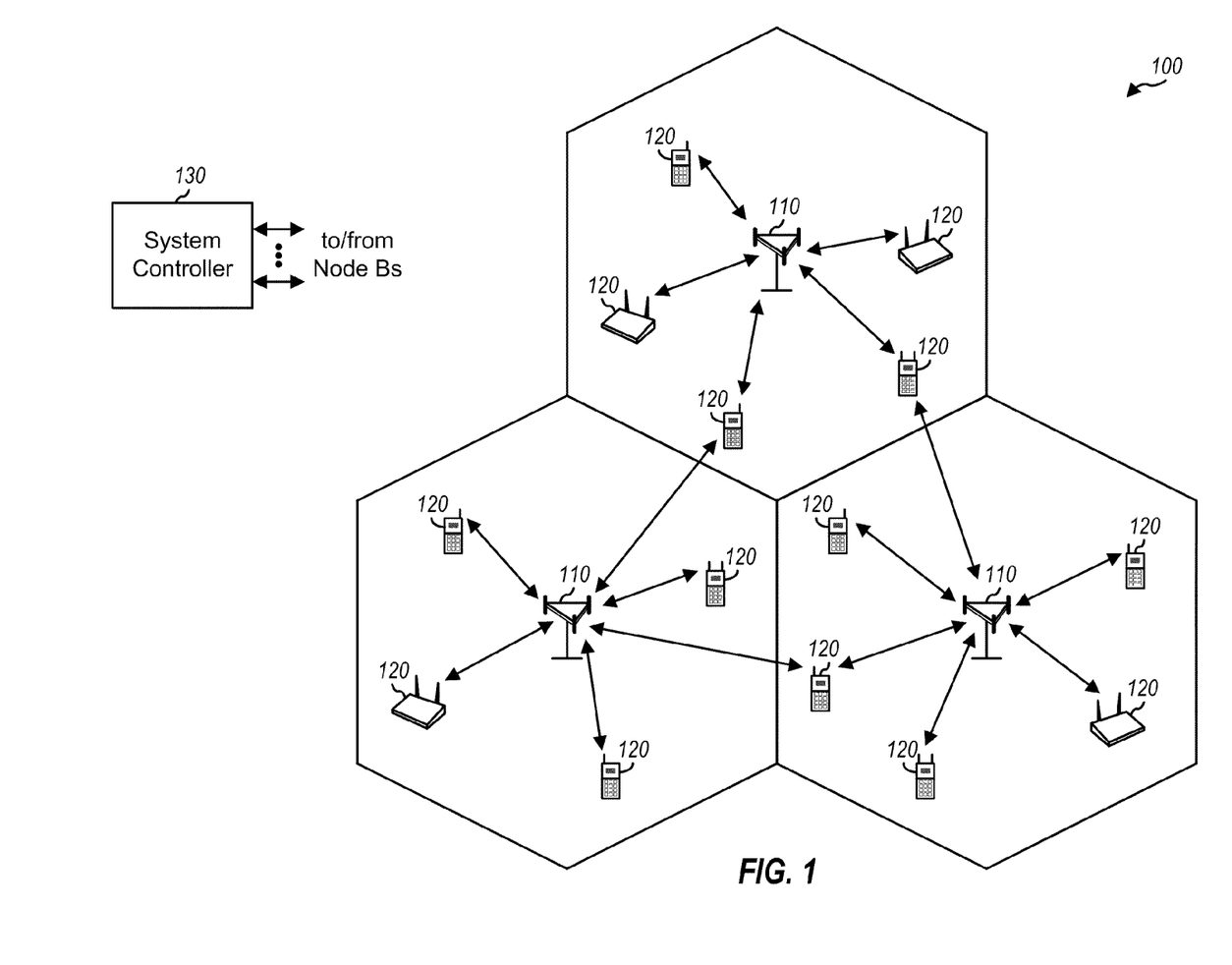
FIG. 1 illustrates an example multiple access wireless communication system, in accordance with certain aspects of the present disclosure.

FIG. 1 shows a wireless communication system 100, which may be an LTE system or some other system. System 100 may include a number of Node Bs and other network entities. A Node B may be a fixed station that communicates with the UEs and may also be referred to as an evolved Node B (eNB), a base station, or an access point. Each Node B provides communication coverage for a particular geographic area. To improve system capacity, the overall coverage area of a Node B may be partitioned into multiple (e.g., three) smaller areas. Each smaller area may be served by a respective Node B subsystem. In 3GPP, the term "cell" can refer to the smallest coverage area of a Node B and/or a Node B subsystem serving this coverage area.

UEs 120 may be dispersed throughout the system, and each UE may be stationary or mobile. A UE may also be referred to as a mobile station, a terminal, an access terminal, a subscriber unit, or a station. A UE may be a cellular phone, a personal digital assistant (PDA), a wireless modem, a wireless communication device, a handheld device, a laptop computer, or a cordless phone. A UE may communicate with a Node B via the downlink and uplink.

A system controller 130 may couple to a set of Node Bs and provide coordination and control for these Node Bs. System controller 130 may be a single network entity or a collection of network entities.

Figure 2:
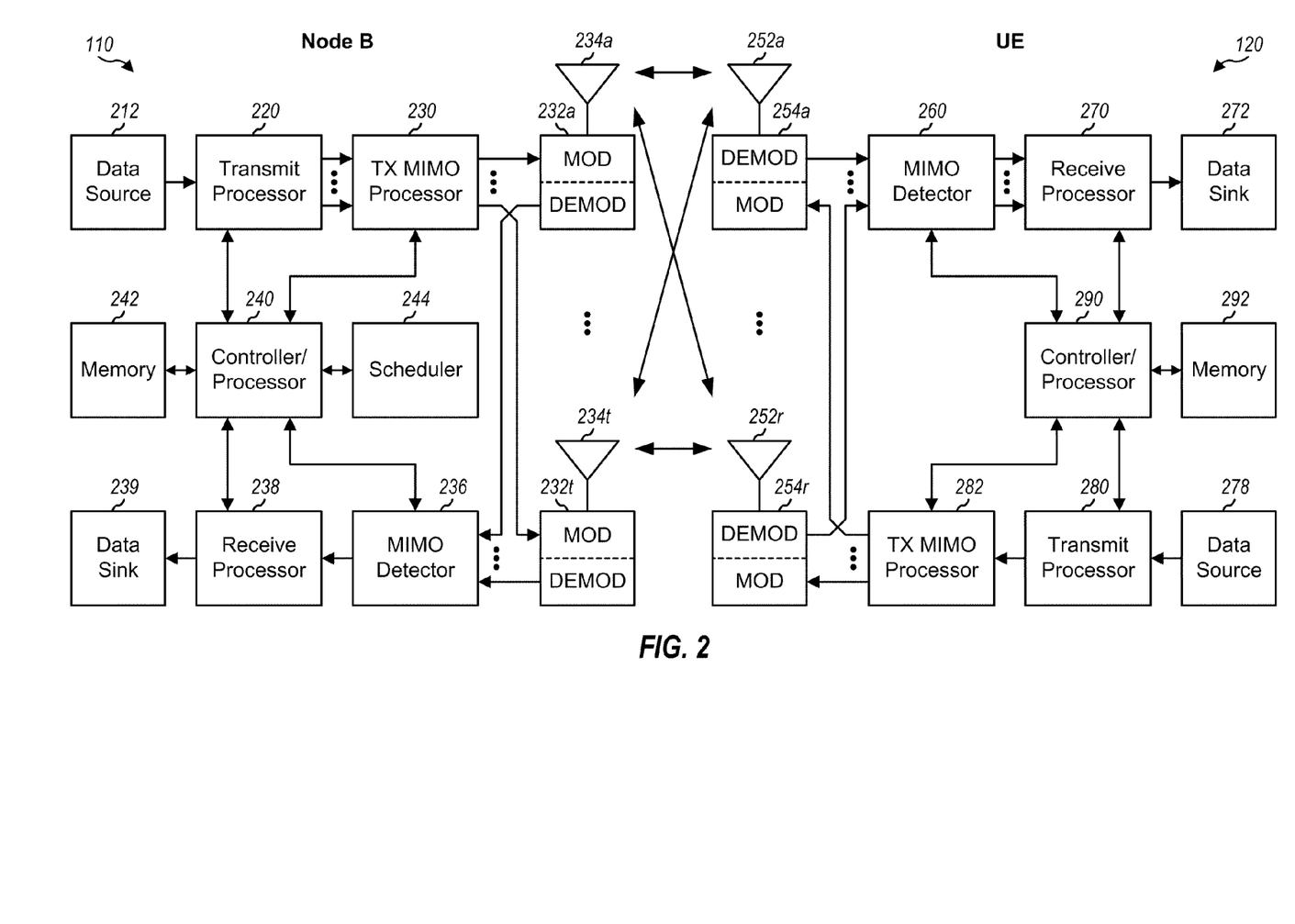
FIG. 2 illustrates a block diagram of an example Node B and UE, in accordance with certain aspects of the present disclosure.

FIG. 2 shows a block diagram of a design of a Node B 110 and a UE 120, which may be one of the Node Bs and one of the UEs in FIG. 1. In this design, Node B 110 is equipped with T antennas 234a through 234t, and UE 120 is equipped with R antennas 252a through 252r, where in general T≥1 and R≥1.

At Node B 110, a transmit processor 220 may receive traffic data from a data source 212 for one or more UEs, process (e.g., encode and symbol map) the traffic data for each UE based on one or more modulation and coding schemes, and provide data symbols for all UEs. Transmit processor 220 may also process control information and provide control symbols. A transmit (TX) multiple-input multiple-output (MIMO) processor 230 may multiplex the data symbols, the control symbols, pilot symbols, and possibly other symbols. TX MIMO processor 230 may perform spatial processing (e.g., precoding) on the multiplexed symbols, if applicable, and provide T output symbol streams to T modulators (MOD) 232a through 232t. Each modulator 232 may process its output symbol stream (e.g., for OFDM) to obtain an output sample stream. Each modulator 232 may further condition (e.g., convert to analog, filter, amplify, and upconvert) its output sample stream and generate a downlink signal. T downlink signals from modulators 232a through 232t may be transmitted via antennas 234a through 234t, respectively.

At UE 120, R antennas 252a through 252r may receive the T downlink signals from Node B 110, and each antenna 252 may provide a received signal to an associated demodulator (DEMOD) 254. Each demodulator 254 may condition (e.g., filter, amplify, downconvert, and digitize) its received signal to obtain samples and may further process the samples (e.g., for OFDM) to obtain received symbols. A MIMO detector 260 may obtain received symbols from all R demodulators 254, perform MIMO detection on the received symbols if applicable, and provide detected symbols. A receive processor 270 may process (e.g., symbol demap and decode) the detected symbols, provide decoded data to a data sink 272, and provide decoded control information to a controller/processor 290.

On the uplink, at UE 120, traffic data from a data source 278 and control information from controller/processor 290 may be processed (e.g., encoded and symbol mapped) by a transmit processor 280, spatially processed (e.g., precoded) by a TX MIMO processor 282, and further processed by modulators 254a through 254r (e.g., for OFDM, or SC-FDM) to generate R uplink signals, which may be transmitted via antennas 252a through 252r. At Node B 110, the R uplink signals from UE 120 may be received by antennas 234a through 234t, processed by demodulators 232a through 232t, spatially processed by a MIMO detector 236, and further processed (e.g., symbol demapped and decoded) by a receive processor 238 to recover the traffic data and control information sent by UE 120. The decoded data may be provided to a data sink 239. A controller/processor 240 may control data transmission to UE 120 based on the control information received from the UE.

Controllers/processors 240 and 290 may direct the operation at Node B 110 and UE 120, respectively. Memories 242 and 292 may store data and program codes for Node B 110 and UE 120, respectively. A scheduler 244 may select UE 120 and/or other UEs for transmission on the downlink and/or uplink.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, or bins. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for system bandwidth of 1.25, 2.5, 5, 10 or 20 MHz, respectively.

Figure 3:
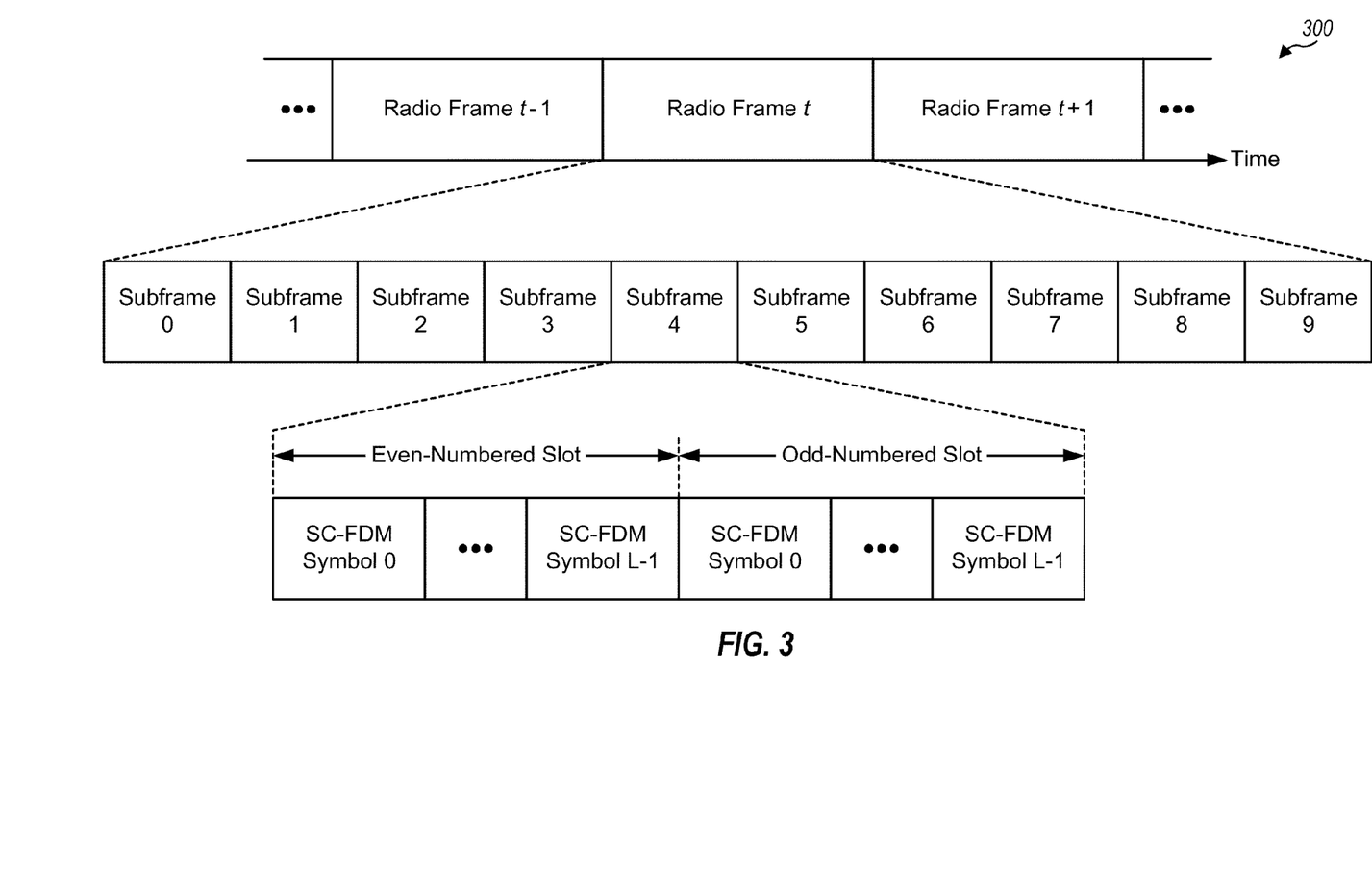
FIG. 3 illustrates an example uplink frame structure, in accordance with certain aspects of the present disclosure.

FIG. 3 shows an example frame structure 300 that may be used for transmission. The transmission timeline may be partitioned into units of radio frames. Each radio frame may have a predetermined duration (e.g., 10 milliseconds (ms)) and may be partitioned into 10 subframes. Each subframe may include two slots, and each slot may include L symbol periods.

Resource blocks may be defined based on the available time and frequency resources. A resource block may include N subcarriers (e.g., N=12 subcarriers) in one slot. The available resource blocks may be assigned to UEs for transmission of traffic data and control information.

Figure 4A:
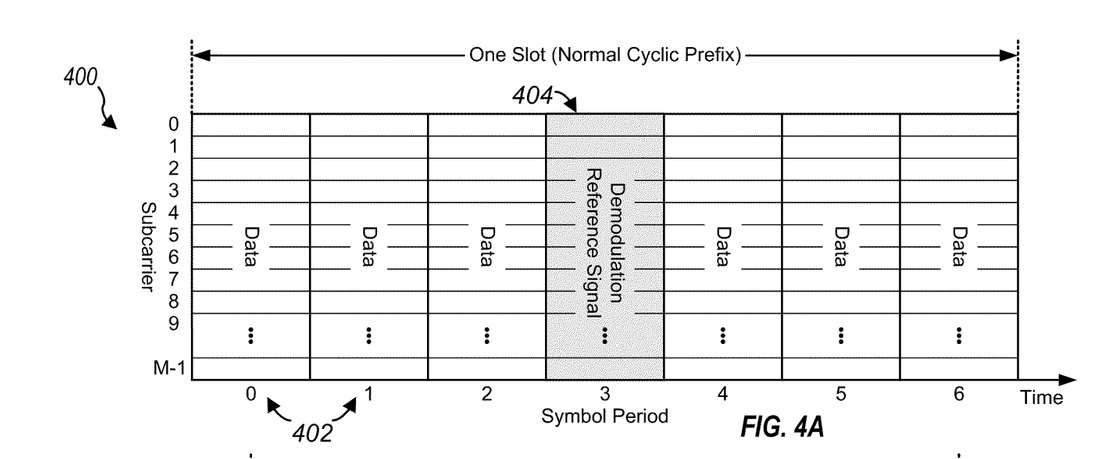
FIGS. 4A and 4B illustrate example uplink frame structures with normal and extended cyclic prefixes, respectively.

FIG. 4A shows an example transmission 400 on the uplink in one slot with a normal cyclic prefix. The slot includes L=7 symbol periods 402 (periods 0 through 6) for the normal cyclic prefix. An SC-FDM symbol containing data on M subcarriers may be sent in each of symbol periods 0, 1, 2, 4, 5 and 6 in the slot. M may be an integer multiple of N, which is the number of subcarriers for one resource block. An SC-FDM symbol containing a demodulation reference signal (DM-RS) 404 may be sent on the M subcarriers in the middle symbol period 3. The DM-RS 404 may be used by a Node B for coherent detection of the other SC-FDM symbols containing data. The DM-RS 404 may also be referred to as a reference signal, pilot, preamble, reference, or training signal.

Figure 4B:
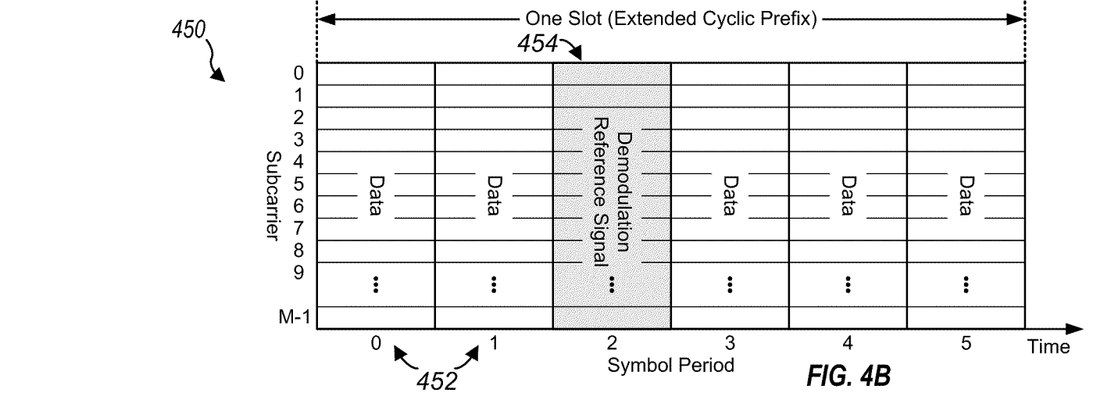

FIG. 4B shows an example transmission 450 on the uplink in one slot with an extended cyclic prefix. The slot includes L=6 symbol periods 452 (periods 0 through 5) for the extended cyclic prefix. An SC-FDM symbol containing data on M subcarriers may be sent in each of symbol periods 0, 1, 3, 4 and 5 in the slot. An SC-FDM symbol containing a DM-RS 454 may be sent on the M subcarriers in symbol period 3.

In the designs shown in FIGS. 4A and 4B, a reference signal is sent in each slot and occupies an entire SC-FDM symbol. The reference signal accounts for 14% overhead for the normal cyclic prefix and 17% overhead with the extended cyclic prefix. Lower overhead with the demodulation reference signal is desirable.

Multiplexing Data and Reference Signal

It may be desirable to reduce the overhead associated with the demodulation reference signal. However, one challenge to such overhead reduction may be to preserve the SC-FDM waveform.

In an aspect, a reference signal may be multiplexed with data in the time domain in order to reduce overhead while preserving the SC-FDM waveform. The multiplexing of the reference signal and data may be performed in various manners. As will be described below, the exact manner used may represent a tradeoff between pilot overhead, channel estimation performance, and throughput. According to certain aspects, an SC-FDM symbol containing the multiplexed reference signal and data may be sent in place of a conventional SC-FDM symbol containing only reference signal.

Figure 5:
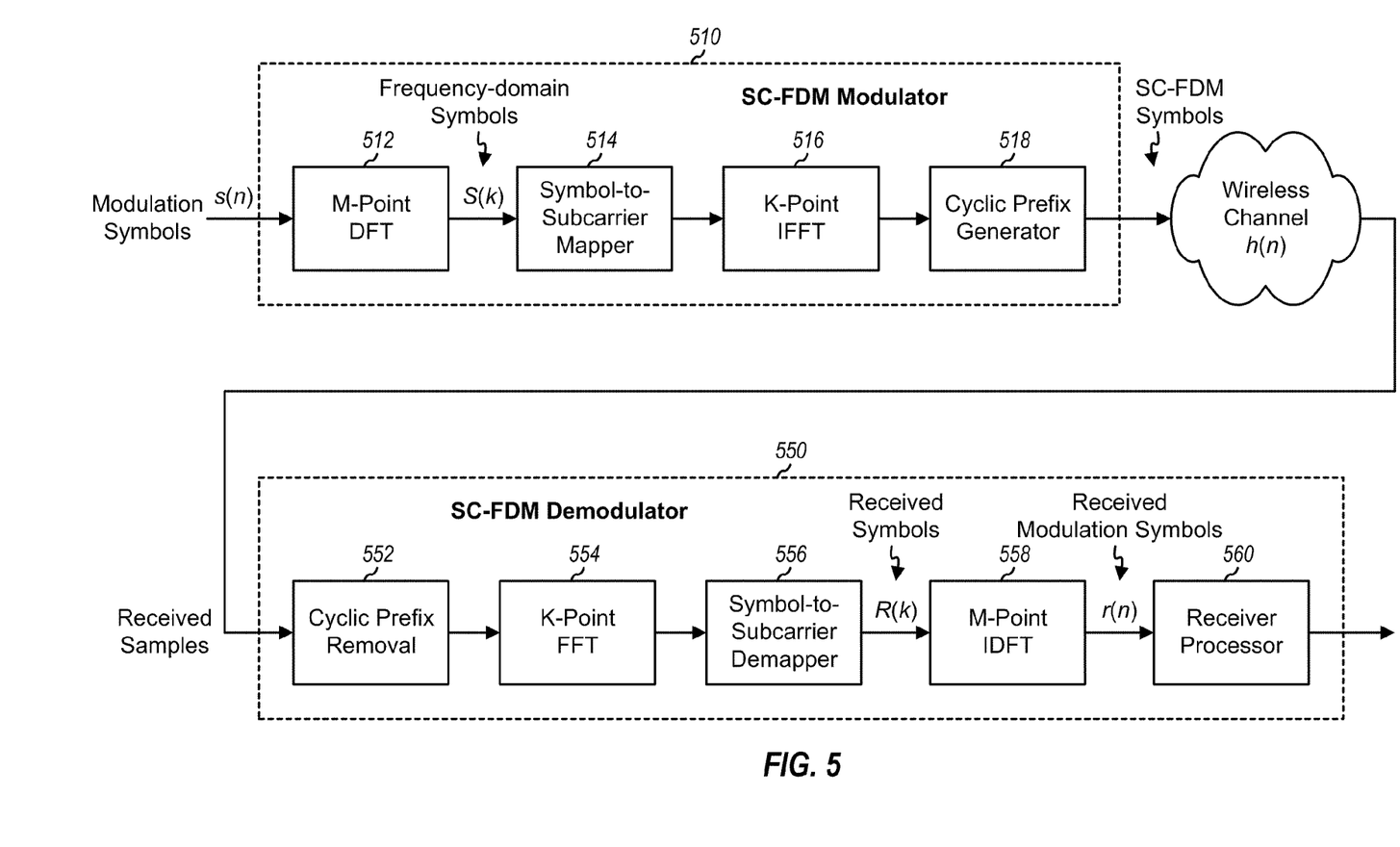
FIG. 5 illustrates an example modulator and de-modulator, in accordance with certain aspects of the present disclosure.

FIG. 5 shows a block diagram of an example SC-FDM modulator 510 at a UE and an example SC-FDM demodulator 550 at a Node B that may be utilized in accordance with certain aspects of the present disclosure. The SC-FDM modulator 510 may be configured to multiplex reference and data conveying modulation symbols s(n) in the time domain to obtain and transmit an SC-FDM waveform with reduced overhead. The SC-FDM De-Modulator 550 may be configured to receive the SC-FDM waveform and de-multiplex the reference and data conveying modulation symbols as r (n) for further receiver processing.

Within SC-FDM modulator 510, a discrete Fourier transform (DFT) unit 512 receives M modulation symbols for M subcarriers used for transmission. The M modulation symbols may be for reference signal and/or data. DFT unit 512 performs an M-point DFT on the M modulation symbols to transform these modulation symbols from time domain to frequency domain and provides M frequency-domain symbols. A reference signal may also be generated in the frequency domain to directly obtain M frequency-domain symbols, in which case DFT unit 512 may be omitted.

A symbol-to-subcarrier mapper 514 maps the M frequency-domain symbols to the M subcarriers used for transmission and maps zero symbols with signal value of zero to the K−M remaining subcarriers. An inverse fast Fourier transform (IFFT) unit 516 receives K symbols for the K total subcarriers from mapper 514, performs a K-point IFFT on these K symbols to transform the symbols from the frequency domain to the time domain, and provides K time-domain samples for a useful portion of an SC-FDM symbol. Each time-domain sample is a complex value to be transmitted in one sample period. A cyclic prefix generator 518 copies the last C samples of the useful portion and appends these C samples to the front of the useful portion to form an SC-FDM symbol containing K+C samples. The cyclic prefix is used to combat inter-symbol interference (ISI) caused by frequency selective fading. The SC-FDM symbol may be transmitted via a wireless channel having a channel impulse response of h(n).

At the Node B, within SC-FDM demodulator 550, a cyclic prefix removal unit 552 obtains K+C received samples for a received SC-FDM symbol, removes C received samples corresponding to the cyclic prefix, and provides K received samples for the useful portion of the received SC-FDM symbol. A fast Fourier transform (FFT) unit 554 performs a K-point FFT on the K received samples and provides K received symbols for the K total subcarriers. A symbol-to-subcarrier demapper 556 provides M received symbols from the M subcarriers used for transmission and discards the remaining received symbols. An inverse DFT (IDFT) unit 558 performs an M-point IDFT on the M received symbols and provides M received modulation symbols. A receiver processor 560 processes the M received modulation symbols to derive a channel estimate and recover the data sent in the received SC-FDM symbol.

The wireless channel between a transmit antenna and a receive antenna may be characterized by either a time-domain channel impulse response h(n) or a corresponding frequency-domain channel frequency response H(k). The channel frequency response is the DFT of the channel impulse response. This relationship may be expressed as:

$$H(k) = DFT\{h(n)\} = \sum_{n=0}^{L-1} h(n) \cdot e^{-j\frac{2\pi kn}{K}}, \quad \text{Eq (1)}$$

for $k = 0, \ldots, M-1$, where L is the number of channel taps in the channel impulse response h(n). Equation (1) assumes, without loss of generality, that the M subcarriers used for transmission have indices of 0 through M−1.

The received symbols from demapper 556 may be expressed as:

$$R = H \cdot S + W, \quad \text{Eq (2)}$$

where
$H = [H(0) \ldots H(M-1)]^T$ is an M×1 vector for the channel frequency response,
$S = [S(0) \ldots S(M-1)]^T$ is an M×1 vector of frequency-domain symbols from DFT unit 512,
$R = [R(0) \ldots R(M-1)]^T$ is an M×1 vector of received symbols from demapper 556,
W is an M×1 noise vector, and
"$T$" denotes a transpose.

An M-point IDFT of the received frequency domain signal in Eq. (2) may be expressed as:

$$r(n) = h'(n) \otimes_M s(n) + w(n), \quad \text{Eq (3)}$$

where
s(n) denotes the modulation symbols provided to DFT unit 512,
r(n) denotes the M-point IDFT of $\{R(0), \ldots, R(M-1)\}$,
h'(n) denotes an M-tap channel impulse response,
w(n) denotes noise in the time domain, and
$\otimes_M$ denotes an M-point circular convolution.

The M-tap channel impulse response may be obtained as:

$$h'(n) = \frac{1}{M}\sum_{k=0}^{M-1} H(k) e^{j\frac{2\pi kn}{M}}, \quad \text{Eq (4)}$$

for $n = 0, \ldots, M-1$.

The number of channel taps with large energy in h'(n) is approximately equal to $\upsilon = LM/K$.

In one design, the M time domain symbols including both reference signal and data-conveying modulation symbols for one SC-FDM symbol $\{s(0), s(1), \ldots, s(M-1)\}$ may have the following structure:

$$s = \left[ \underbrace{p(Q_1-P_1), \ldots, p(Q_1-1)}_{P_1 \text{ Points}}, \underbrace{p(0), \ldots, p(Q_1-1)}_{Q_1 \text{ Points}}, \underbrace{p(0), \ldots, p(P_2-1)}_{P_2 \text{ Points}}, \right. \\ \left. \underbrace{d(Q_2-P_1), \ldots, d(Q_2-1)}_{P_1 \text{ Points}}, \underbrace{d(0), \ldots, d(Q_2-1)}_{Q_2 \text{ Points}}, \underbrace{d(0), \ldots, d(P_2-1)}_{P_2 \text{ Points}} \right]^T, \quad \text{Eq (5)}$$

where
p(0) through $p(Q_1-1)$ are pilot symbols for the reference signal,
d(0) through $d(Q_2-1)$ are modulation symbols for data,
s is an M×1 vector of modulation symbols provided to DFT unit 512, and
$Q_1 + Q_2 + 2 \cdot (P_1 + P_2) = M$.

Figure 6:
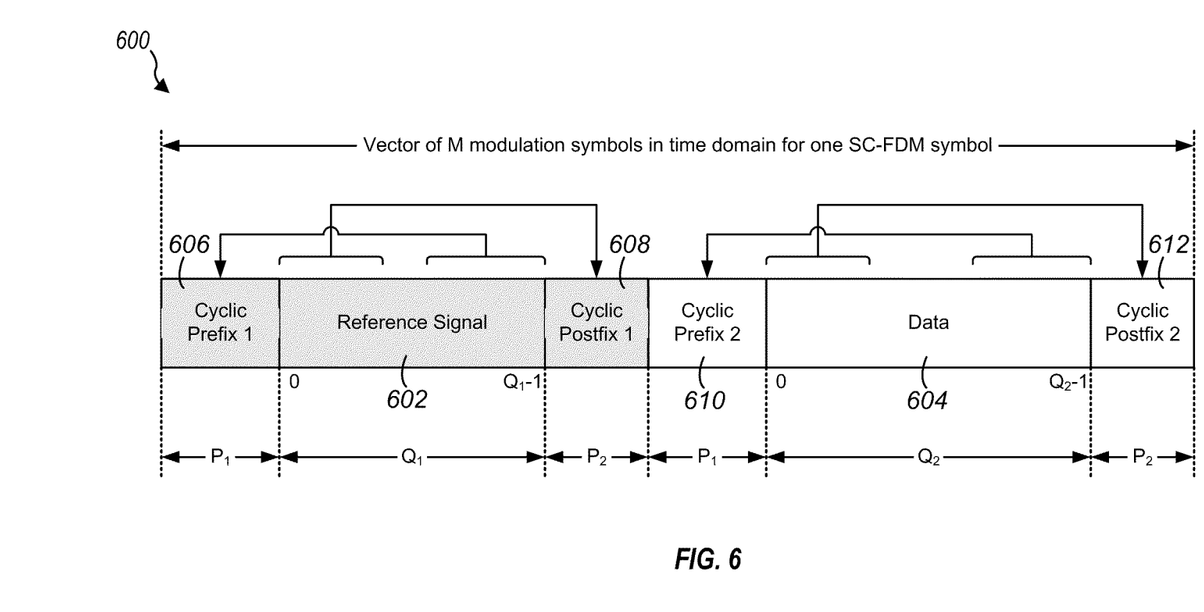
FIG. 6 illustrates an example SC-FDM symbol with multiplexed reference and data-conveying modulation symbols, in accordance with certain aspects of the present disclosure.

FIG. 6 shows M modulation symbols, with reference symbols and data-conveying modulation symbols multiplexed in the time domain for one SC-FDM symbol, in accordance with certain aspects of the present disclosure.

In the illustrated example, $Q_1$ pilot symbols may be sent for a reference signal. The last $P_1$ modulation symbols for the reference signal may be copied and appended as a cyclic prefix before the reference signal. The first $P_2$ modulation symbols for the reference signal may be copied and appended as a cyclic postfix after the reference signal. $Q_2$ modulation symbols may be sent for data. The last $P_1$ modulation symbols for the data may be copied and appended as a cyclic prefix before the data. The first $P_2$ modulation symbols for the data may be copied and appended as a cyclic postfix after the data.

The Node B may form two vectors with the M received symbols for the SC-FDM symbol, as follows:

$$r_1 = [r(P_1), r(P_1+1), \ldots, r(P_1+Q_1-1)]^T, \quad \text{Eq (6)}$$

$$r_2 = [r(2P_1+P_2+Q_1), r(2P_1+P_2+Q_1+1), \ldots, r(2P_1+P_2+Q_1+Q_2-1)]^T, \quad \text{Eq (7)}$$

where $r_1$ is a $Q_1 \times 1$ vector of received symbols for the reference signal, and
$r_2$ is a $Q_2 \times 1$ vector of received modulation symbols for the data.

Vector $r_1$ may be obtained by (i) discarding the first $P_1$ received modulation symbols corresponding to the cyclic prefix for the reference signal and (ii) using the next $Q_1$ received modulation symbols corresponding to the reference signal. Vector $r_2$ may be obtained by (i) discarding the first $2P_1+P_2+Q_1$ received modulation symbols corresponding to the entire reference signal and the cyclic prefix for the data and (ii) using the next $Q_2$ received modulation symbols corresponding to the data portion.

The cyclic prefix length $P_1$ and the cyclic postfix length $P_2$ may be selected such that $P_1+P_2 \geq \upsilon$. The received signal in Eq. (6) and Eq. (7) may then be expressed as:

$$r_1(n)=h_1(n) \otimes_{Q_1} p(n)+w_1(n), \quad \text{Eq (8)}$$

$$r_2(n)=h_2(n) \otimes_{Q_2} d(n)+w_2(n), \quad \text{Eq (9)}$$

where
- $r_1(n)$ and $r_2(n)$ are just the n-th entry in vectors $r_1$ and $r_2$, respectively,
- $\otimes_{Q_1}$ and $\otimes_{Q_2}$ denote $Q_1$-point and $Q_2$-point circular convolution, respectively,
- $h_1(n)$ and $h_2(n)$ are different truncated versions of h'(n), and
- $w_1(n)$ and $w_2(n)$ are noise for vectors $r_1$ and $r_2$, respectively.

DFT may be performed for $r_1(n)$ and $r_2(n)$ to obtain the following:

$$R_1(k)=H_1(k) \cdot P(k)+W(k), \text{ for } k=0, \ldots, Q_1-1, \quad \text{Eq (10)}$$

$$R_2(k)=H_2(k) \cdot D(k)+W_2(k), \text{ for } k=0, \ldots, Q_2-1, \quad \text{Eq (11)}$$

where
- $H_1(k)=\text{DFT }\{h_1(n)\}$, $H_2(k)=\text{DFT }\{h_2(n)\}$,
- $P(k)=\text{DFT }\{p(n)\}$, $D(k)=\text{DFT }\{d(n)\}$,
- $R_1(k)=\text{DFT }\{r_1(n)\}$ and $R_2(k)=\text{DFT }\{r_2(n)\}$.

The $Q_1$-point sequence p(n) may be for the reference signal. Channel estimation may then be performed based on the received symbols $R_1(k)$ shown in equation (10). The $Q_2$-point sequence d(n) as well as the data modulation symbols sent in the other SC-FDM symbols may be demodulated with the channel estimate. Parameters $Q_1$ and $Q_2$ may be flexibly selected to achieve different pilot overhead and to tradeoff between throughput and channel estimation performance. Furthermore, since modulation symbols for the reference signal and data are multiplexed in the time domain, the SC-FDM waveform is preserved.

The description above assumes that the UE is equipped with a single transmit antenna. If the UE is equipped with multiple transmit antennas, then the vector of symbols provided to DFT unit 512 for each transmit antenna may still have the structure shown in equation (5). However, a different reference signal sequence may be sent from each antenna. For example, the vector of symbols in the time domain for two transmit antennas may be expressed as:

$$s_1 = \left[ \underbrace{p_1(Q_1-P_1), \ldots, p_1(Q_1-1)}_{P_1 \text{ Points}}, \underbrace{p_1(0), \ldots, p_1(Q_1-1)}_{Q_1 \text{ Points}}, \underbrace{p_1(0), \ldots, p_1(P_2-1)}_{P_2 \text{ Points}}, \right.$$
$$\left. \underbrace{d_1(Q_2-P_1), \ldots, d_1(Q_2-1)}_{P_1 \text{ Points}}, \underbrace{d_1(0), \ldots, d_1(Q_2-1)}_{Q_2 \text{ Points}}, \underbrace{d_1(0), \ldots, d_1(P_2-1)}_{P_2 \text{ Points}} \right]^T, \quad \text{Eq (12)}$$

$$s_2 = \left[ \underbrace{p_2(Q_1-P_1), \ldots, p_2(Q_1-1)}_{P_1 \text{ Points}}, \underbrace{p_2(0), \ldots, p_2(Q_1-1)}_{Q_1 \text{ Points}}, \underbrace{p_2(0), \ldots, p_2(P_2-1)}_{P_2 \text{ Points}}, \right.$$
$$\left. \underbrace{d_2(Q_2-P_1), \ldots, d_2(Q_2-1)}_{P_1 \text{ Points}}, \underbrace{d_2(0), \ldots, d_2(Q_2-1)}_{Q_2 \text{ Points}}, \underbrace{d_2(0), \ldots, d_2(P_2-1)}_{P_2 \text{ Points}} \right]^T,$$

where
- $p_1(n)$ denotes a reference signal sequence for transmit antenna 1,
- $p_2(n)$ denotes a reference signal sequence for transmit antenna 2, and
- $d_1(n)$ and $d_2(n)$ denote data sequences for transmit antennas 1 and 2, respectively.

The DFT of $p_1(n)$ may have constant modulus, so that $$P_1(k) = \sum_{n=0}^{Q_1-1} p_1(n) \cdot \exp(-j2\pi kn/Q_1)$$

has the same magnitude for $k=0, \ldots, Q_1-1$. Furthermore, $p_2(n)$ may be a cyclic-shifted version of $p_1(n)$, so that $p_2(n)=p_1((n-n_0) \bmod Q_1)$, where $n_0$ is the amount of cyclic shift. In this case, the two channels from the two transmit antennas may be resolved in the time domain when the amount of cyclic shift $n_0$ is larger than $\upsilon=\text{LM/K}$, which is similar to the operation when multiple reference signals are code division multiplexed.

A transmission scheme that can flexibly multiplex a reference signal and data in the time domain has been described above. The transmission scheme may be used for an SC-FDM symbol carrying a demodulation reference signal in order to reduce pilot overhead and potentially increase throughput. The modulation symbols for the reference signal and data may be multiplexed in the time domain prior to DFT and may have the structure shown in equation (5) for each transmit antenna. The transmission scheme may also be used for an SC-FDM symbol carrying data to improve channel estimation performance, which may be useful in a high Doppler channel when the channel response may vary widely within one slot. According to certain aspects, the multiplexing described herein may be altered based on various monitored channel parameters, such as the monitored channel Doppler effects.

The cyclic prefix length $P_1$ and the cyclic postfix length $P_2$ may be configured in various manners. In one design, $P_1$ and $P_2$ may be semi-statically configured via Layer 3 signaling. In another design, $P_1$ and $P_2$ may be dynamically configured via signaling sent on a Physical Downlink Control Channel (PDCCH). In yet another design, $P_1$ and $P_2$ may be implicitly tied with related system configuration (e.g., the normal cyclic prefix, the extended cyclic prefix, and single frequency network or SFN). Furthermore, the cyclic prefix 606/postfix 608 for reference signal 602 may be configured to be different from the cyclic prefix 610/postfix 612 for the data 604 in FIG. 6. For example, a longer cyclic prefix/postfix may be appended to the reference signal 602 to obtain better channel estimation.

The reference signal sequence length $Q_1$ and the data sequence length $Q_2$ may also be configured in various manners. In one design, $Q_1$ and $Q_2$ may be semi-statically configured via Layer 3 signaling. In another design, $Q_1$ and $Q_2$ may be dynamically configured via signaling sent on the PDCCH.

In yet another design, $Q_1$ and $Q_2$ may be implicitly tied with related UE uplink transmission parameters and conditions (e.g., uplink transmission bandwidth, downlink geometry, and/or moving speed).

Figure 7:
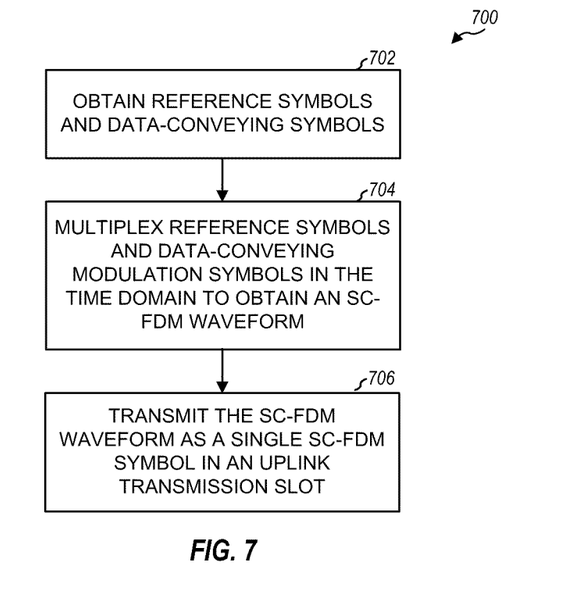
FIG. 7 illustrates example operations to generate an SC-FDM symbol, in accordance with certain aspects of the present disclosure.

FIG. 7 shows example operations 700 for transmitting a reference signal and data in a wireless communication system. The operations 700 may be performed, for example, by a UE (as described below) or by some other entity. The operations 700 begin, at 702, by obtaining reference symbols and data-conveying symbols. At 704, the reference symbols and data-conveying modulation symbols are multiplexed in the time-domain to obtain an SC-FDM waveform. At 706, the SC-FDM waveform is transmitted in an uplink transmission slot.

As described above, according to certain embodiments, a UE may form a first symbol sequence comprising a first cyclic prefix, a first useful portion, and a first cyclic postfix for the reference signal. The first useful portion may comprise the first symbols, e.g., $p(0)$ through $p(Q_1-1)$ in equation (5). The first cyclic prefix may comprise a first subset of the first symbols, e.g., the last $P_1$ symbols in the first useful portion, as shown in FIG. 6. The first cyclic postfix may comprise a second subset of the first symbols, e.g., the first $P_2$ symbols in the first useful portion.

The UE may form a second symbol sequence comprising a second cyclic prefix, a second useful portion, and a second cyclic postfix for the data. The second useful portion may comprise the second symbols, e.g., $d(0)$ through $d(Q_2-1)$ in equation (5). The second cyclic prefix may comprise a first subset of the second symbols, e.g., the last $P_1$ symbols in the second useful portion, as shown in FIG. 6. The second cyclic postfix may comprise a second subset of the second symbols, e.g., the first $P_2$ symbols in the second useful portion. The first and second cyclic prefixes may have a first length of $P_1$. The first and second cyclic postfixes may have a second length of $P_2$. The UE may receive signaling indicating the first length, the second length, the length of the first useful portion, the length of the second useful portion, or any combination thereof.

The UE may have multiple transmit antennas. In this case, the first and second symbols may be for a first transmit antenna. The UE may multiplex third symbols for a reference signal and fourth symbols for data for a second transmit antenna in the time domain. The UE may cyclically shift the first symbols to obtain the third symbols. The UE may generate a second SC-FDM symbol for the second transmit antenna based on the multiplexed third and fourth symbols.

According to certain aspects, the UE may perform a DFT on the multiplexed first and second symbols to obtain frequency-domain symbols. The UE may map the frequency-domain symbols to subcarriers used for transmission and may map zero symbols to subcarriers not used for transmission. The UE may perform an IFFT on the mapped symbols to obtain samples for a useful portion of the SC-FDM symbol. The UE may append a cyclic prefix to the useful portion to obtain the SC-FDM symbol.

Figure 8:
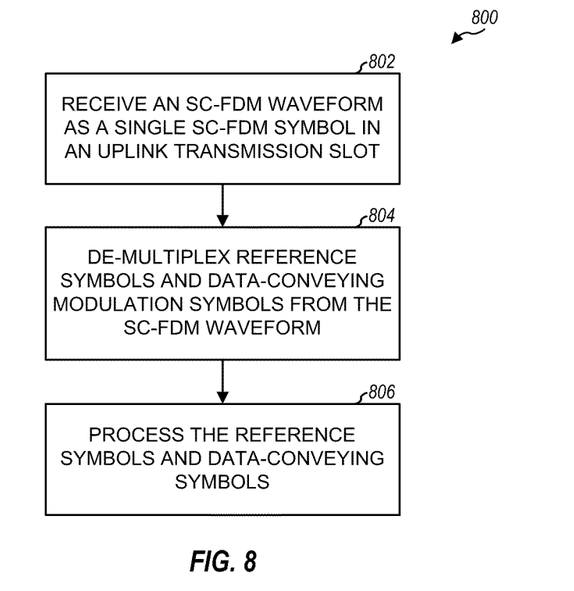
FIG. 8 illustrates example operations to process a received SC-FDM symbol, in accordance with certain aspects of the present disclosure.

FIG. 8 illustrates example operations 800 for receiving a reference signal and data in a wireless communication system. The operations 800 may be performed, for example, by a Node B (as described below) or by some other entity.

The operations 800 begin, at 802, by receiving an SC-FDM waveform as a single SC-FDM symbol in an uplink transmission slot. At 804, reference symbols and data-conveying modulation symbols are de-multiplexed (in the time domain) from the SC-FDM waveform. The de-multiplexed reference symbols and data-conveying modulation symbols are further processed, at 806.

As described above, the Node B may obtain a first sequence of symbols from a received SC-FDM symbol comprising a reference signal and data multiplexed in the time domain. The Node B may demultiplex the first sequence of symbols to obtain a second sequence of symbols for the reference signal and a third sequence of symbols for the data. The first sequence of symbols may correspond to $r(n)$ from DFT unit 558, the second sequence of symbols may correspond to $r_1(n)$ shown in equations (6) and (8), and the third sequence of symbols may correspond to $r_2(n)$ shown in equations (7) and (9).

The additional processing, according to 806 may include channel estimation used for further demodulation. For example, the Node B may derive a channel estimate based on the second sequence of symbols. The Node B may then perform demodulation for the third sequence of symbols based on the channel estimate.

According to certain aspects, the first sequence of symbols may comprise a first cyclic prefix, a first useful portion, and a first cyclic postfix for the reference signal. The Node B may form the second sequence of symbols based on symbols in the first sequence corresponding to the first useful portion. The first sequence of symbols may further comprise a second cyclic prefix, a second useful portion, and a second cyclic postfix for the data. The Node B may form the third sequence of symbols based on symbols in the first sequence corresponding to the second useful portion.

According to certain aspects, the Node B may transform the second sequence of symbols to obtain frequency-domain symbols, e.g., $R_1(k)$ shown in equation (10). The Node B may then obtain channel gains for multiple subcarriers based on the frequency-domain symbols. The first sequence of symbols may comprise a first reference signal sent from a first transmit antenna and a second reference signal sent from a second transmit antenna at a UE. The Node B may derive a first channel estimate for the first transmit antenna based on the second sequence of symbols and the first reference signal. The Node B may derive a second channel estimate for the second transmit antenna based on the second sequence of symbols and the second reference signal.

Figure 7A:
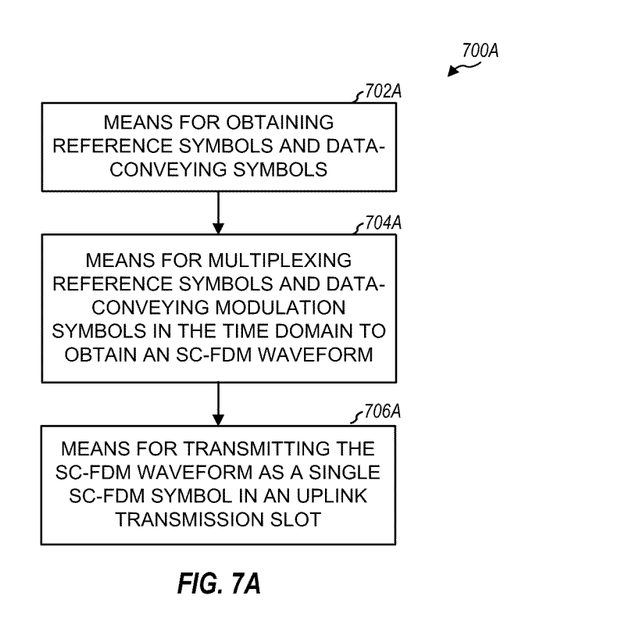
FIG. 7A is a block diagram of example components capable of performing the operations shown in FIG. 7.
Figure 8A:
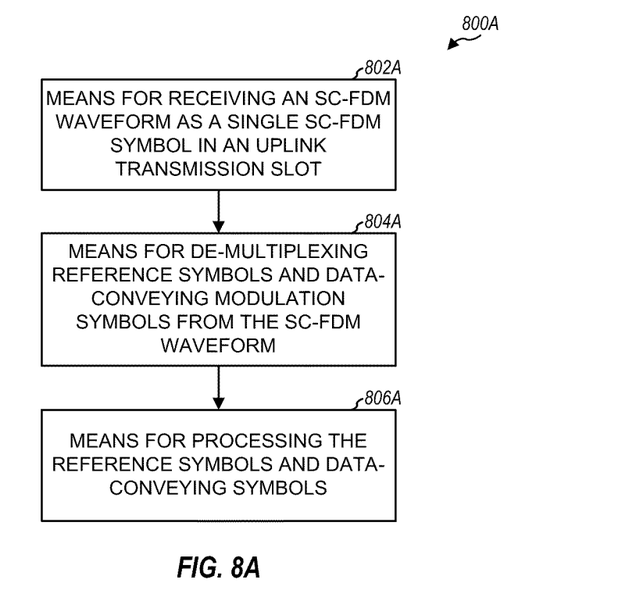
FIG. 8A is a block diagram of example components capable of performing the operations shown in FIG. 8.

The various operations of methods described above may be performed by various hardware and/or software component(s) and/or module(s) corresponding to means-plus-function blocks illustrated in the Figures. Generally, where there are methods illustrated in Figures having corresponding counterpart means-plus-function Figures, the operation blocks correspond to means-plus-function blocks with similar numbering. For example, operations 700 and 800 illustrated in FIGS. 7 and 8 correspond to means-plus-function blocks 700A and 800A illustrated in FIGS. 7A and 8A, respectively.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication via a single carrier frequency division multiplexing (SC-FDM) waveform, comprising:
    multiplexing one or more reference symbols and one or more data-conveying modulation symbols in a time domain to generate a plurality of modulation symbols in a frequency domain and obtain a single SC-FDM symbol comprising at least one reference symbol and at least one data-conveying modulation symbol, wherein the one or more reference symbols are associated with a reference signal and the at least one reference symbol in the SC-FDM symbol comprises a demodulation reference symbol for demodulating the at least one data-conveying modulation symbol in the single symbol; and
    transmitting the single SC-FDM symbol within an SC-FDM symbol period in an uplink transmission slot.

2. The method of claim 1, wherein the SC-FDM symbol comprises:
    at least one of a cyclic prefix and a cyclic postfix for the one or more reference symbols; and
    at least one of a cyclic prefix and a cyclic postfix for the one or more data-conveying modulation symbols.

3. The method of claim 2, wherein a number of the one or more reference symbols that are repeated is different than a number of the one or more data-conveying modulation symbols that are repeated.

4. The method of claim 1, further comprising:
    altering the multiplexing based on a monitored channel parameter.

5. The method of claim 1, further comprising:
    transmitting one or more SC-FDM symbols comprising both data-conveying and reference symbols in one or more other SC-FDM symbol periods of the uplink transmission slot.

6. A method for wireless communication via a single carrier frequency division multiplexing (SC-FDM) waveform, comprising:
    receiving, in an uplink transmission slot, a single SC-FDM symbol comprising at least one reference symbol and at least one data-conveying modulation symbol from a plurality of modulation symbols generated in a frequency domain from one or more reference symbols being multiplexed with one or more data-conveying modulation symbols in a time domain, wherein the one or more reference symbols are associated with a reference signal and the at least one reference symbol in the SC-FDM symbol comprises a demodulation reference symbol for demodulating the at least one data-conveying modulation symbol in the SC-FDM symbol;

de-multiplexing the SC-FDM symbol in a time domain to obtain the at least one reference symbol and the at least one data-conveying modulation symbol; and processing the at least one reference symbol to recover the at least one data-conveying modulation symbol.

7. The method of claim 6, wherein the SC-FDM symbol comprises:

at least one of a cyclic prefix and a cyclic postfix for the one or more reference symbols; and at least one of a cyclic prefix and a cyclic postfix for the one or more data-conveying modulation symbols.

8. The method of claim 7, wherein a number of the one or more reference symbols that are repeated is different than a number of the one or more data-conveying modulation symbols that are repeated.

9. The method of claim 6, further comprising:

receiving one or more SC-FDM symbols comprising both data-conveying and reference symbols in one or more other SC-FDM symbol periods of the uplink transmission slot.

10. An apparatus for wireless communication via a single carrier frequency division multiplexing (SC-FDM) waveform, comprising:

logic for multiplexing one or more reference symbols and one or more data-conveying modulation symbols in a time domain to generate a plurality of modulation symbols in a frequency domain and obtain a single SC-FDM symbol comprising at least one reference symbol and at least one data-conveying modulation symbol, wherein the one or more reference symbols are associated with a reference signal and the at least one reference symbol in the SC-FDM symbol comprises a demodulation reference symbol for demodulating the at least one data-conveying modulation symbol in the SC-FDM symbol; and logic for transmitting the SC-FDM symbol within an SC-FDM symbol period in an uplink transmission slot.

11. The apparatus of claim 10, wherein the SC-FDM symbol comprises:

at least one of a cyclic prefix and a cyclic postfix for the one or more reference symbols; and at least one of a cyclic prefix and a cyclic postfix for the one or more data-conveying modulation symbols.

12. The apparatus of claim 11, wherein a number of the one or more reference symbols that are repeated is different than a number of the one or more data-conveying modulation symbols that are repeated.

13. The apparatus of claim 10, further comprising:

logic for altering the multiplexing based on a monitored channel parameter.

14. The apparatus of claim 10, further comprising:

logic for transmitting one or more SC-FDM symbols comprising both data-conveying and reference symbols in one or more other SC-FDM symbol periods of the uplink transmission slot.

15. An apparatus for wireless communication via a single carrier frequency division multiplexing (SC-FDM) waveform, comprising:

logic for receiving, in an uplink transmission slot, a single SC-FDM symbol comprising at least one reference symbol and at least one data-conveying modulation symbol from a plurality of modulation symbols generated in a frequency domain from one or more reference symbols being multiplexed with one or more data-conveying modulation symbols in a time domain, wherein the one or more reference symbols are associated with a reference signal and the at least one reference symbol in the SC-FDM symbol comprises a demodulation reference symbol for demodulating the at least one data-conveying modulation symbol in the SC-FDM symbol;

logic for de-multiplexing the SC-FDM symbol in time domain to obtain the at least one reference symbols and the at least one data-conveying modulation symbol; and logic for processing the at least one reference symbol to recover the at least one data-conveying modulation symbol.

16. The apparatus of claim 15, wherein the SC-FDM symbol comprises:

at least one of a cyclic prefix and a cyclic postfix for the one or more reference symbols; and at least one of a cyclic prefix and a cyclic postfix for the one or more data-conveying modulation symbols.

17. The apparatus of claim 16, wherein a number of the one or more reference symbols that are repeated is different than a number of the one or more data-conveying modulation symbols that are repeated.

18. The apparatus of claim 15, further comprising:

logic for receiving one or more SC-FDM symbols comprising both data-conveying and reference symbols in one or more other SC-FDM symbol periods of the uplink transmission slot.

19. An apparatus for wireless communication via a single carrier frequency division multiplexing (SC-FDM) waveform, comprising:

means for multiplexing one or more reference symbols associated with a reference signal and one or more data-conveying modulation symbols in a time domain to obtain an SC-FDM symbol; and means for transmitting the SC-FDM symbol within an SC-FDM symbol period in an uplink transmission slot.

20. An apparatus for wireless communication via a single carrier frequency division multiplexing (SC-FDM) waveform, comprising:

means for receiving, in an uplink transmission slot, a single SC-FDM symbol comprising at least one reference symbol and at least one data-conveying modulation symbol from a plurality of modulation symbols generated in a frequency domain from one or more reference symbols being multiplexed with one or more data-conveying modulation symbols in a time domain, wherein the one or more reference symbols are associated with a reference signal and the at least one reference symbol in the SC-FDM symbol comprises a demodulation reference symbol for demodulating the at least one data-conveying modulation symbol in the SC-FDM symbol;

means for de-multiplexing the SC-FDM symbol in a time domain to obtain the at least one reference symbol and the at least one data-conveying modulation symbol; and means for processing the at least one reference symbol to recover the at least one data-conveying modulation symbol.

21. A computer-program product for wireless communication via a single carrier frequency division multiplexing (SC-FDM) waveform, comprising a non-transitory computer readable medium having instructions stored thereon, the instructions being executable by one or more processors and the instructions comprising:

instructions for multiplexing one or more reference symbols and one or more data-conveying modulation symbols in a time domain to generate a plurality of modulation symbols in a frequency domain and obtain a single SC-FDM symbol comprising at least one reference symbol and at least one data-conveying modulation symbol, wherein the one or more reference symbols are associated with a reference signal and the at least one reference symbol in the SC-FDM symbol comprises a demodulation reference symbol for demodulating the at least one data-conveying modulation symbol in the SC-FDM symbol; and instructions for transmitting the SC-FDM symbol within an SC-FDM symbol period in an uplink transmission slot.

22. A computer-program product for wireless communication via a single carrier frequency division multiplexing (SC-FDM) waveform, comprising a non-transitory computer readable medium having instructions stored thereon, the instructions being executable by one or more processors and the instructions comprising:

instructions for receiving, in an uplink transmission slot, a single SC-FDM symbol comprising at least one reference symbol and at least one data-conveying modulation symbol from a plurality of modulation symbols generated in a frequency domain from one or more reference symbols being multiplexed with one or more data-conveying modulation symbols in a time domain, wherein the one or more reference symbols are associated with a reference signal and the at least one reference symbol in the SC-FDM symbol comprises a demodulation reference symbol for demodulating the at least one data-conveying modulation symbol in the SC-FDM symbol;

instructions for de-multiplexing the SC-FDM symbol in a time domain to obtain the at least one reference symbols and the at least one data-conveying modulation symbol; and instructions for processing the at least one reference symbol to recover the at least one data-conveying modulation symbol.

23. An apparatus for wireless communication via a single carrier frequency division multiplexing (SC-FDM) waveform, comprising at least one processor configured to:

multiplex one or more reference symbols and one or more data-conveying modulation symbols in time domain to generate a plurality of modulation symbols in a frequency domain and obtain a single SC-FDM symbol comprising at least one reference symbol and at least one data-conveying modulation symbol, wherein the one or more reference symbols are associated with a reference signal and the at least one reference symbol in the SC-FDM symbol comprises a demodulation reference symbol for demodulating the at least one data-conveying modulation symbol in the SC-FDM symbol; and transmit the SC-FDM symbol within an SC-FDM symbol period in an uplink transmission slot.

24. An apparatus for wireless communication via a single carrier frequency division multiplexing (SC-FDM) waveform, comprising at least one processor configured to:

receive, in an uplink transmission slot, a single SC-FDM symbol comprising at least one reference symbol and at least one data-conveying modulation symbol from a plurality of modulation symbols generated in a frequency domain from one or more reference symbols being multiplexed with one or more data-conveying modulation symbols in a time domain, wherein the one or more reference symbols are associated with a reference signal and the at least one reference symbol in the SC-FDM symbol comprises a demodulation reference symbol for demodulating the at least one data-conveying modulation symbol in the SC-FDM symbol;

de-multiplex the SC-FDM symbol in a time domain to obtain the at least one reference symbols and the at least one data-conveying modulation symbol; and process the at least one reference symbol to recover the at least one data-conveying modulation symbol.

25. The method of claim 6, wherein the processing of the one or more reference symbols to recover the one or more data-conveying modulation symbols comprises:

performing channel estimation utilizing the at least one reference symbol; and, demodulating the at least one data-conveying modulation symbol based on the channel estimation.

26. The apparatus of claim 15, wherein the logic for processing the one or more reference symbols to recover the one or more data-conveying modulation symbols comprises:

logic for performing channel estimation utilizing the at least one reference symbol; and, logic for demodulating the at least one data-conveying modulation symbol based on the channel estimation.

27. The apparatus of claim 20, wherein the means for processing the one or more reference symbols to recover the one or more data-conveying modulation symbols comprises:

means for performing channel estimation utilizing the at least one reference symbol; and, means for demodulating the at least one data-conveying modulation symbol based on the channel estimation.

28. The computer-program product of claim 22, wherein the instructions for processing the one or more reference symbols to recover the one or more data-conveying modulation symbols comprises:

instructions for performing channel estimation utilizing the at least one reference symbol; and, instructions for demodulating the at least one data-conveying modulation symbol based on the channel estimation.

29. The apparatus of claim 24, wherein the at least one processor is further configured to:

perform channel estimation utilizing the at least one reference symbol; and, demodulate the at least one data-conveying modulation symbol based on the channel estimation.

* * * * *